Patented Feb. 6, 1951

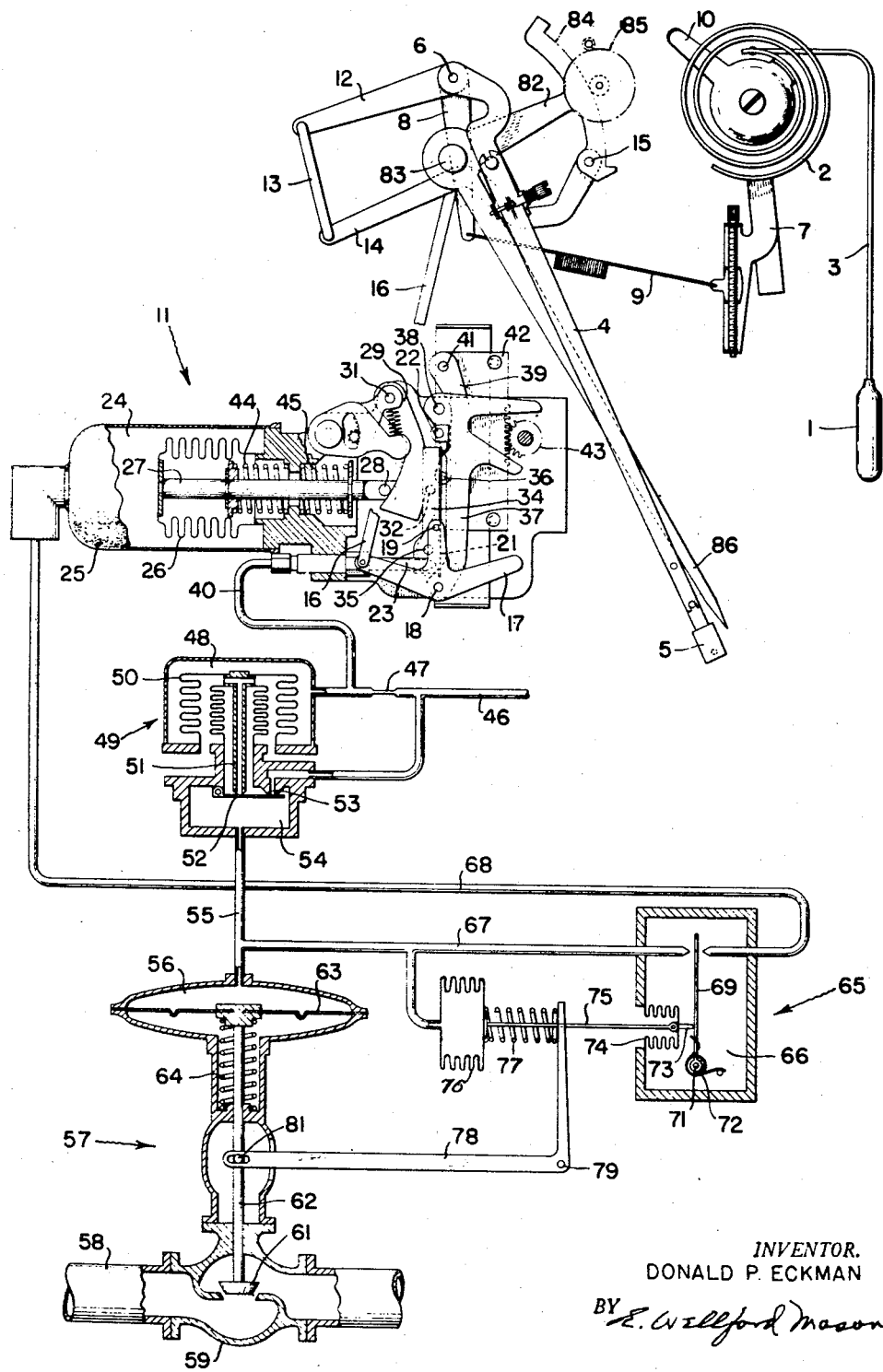

2,540,193

UNITED STATES PATENT OFFICE 2,540,193

AIR-OPERATED CONTROLLER WITH
DELAYED FOLLOW-UP

Donald Preston Eckman, Ithaca, N. Y., assignor, by mesne assignments, to Minneapolis-Honeywell Regulator Company, Minneapolis, Minn., a corporation of Delaware Application February 7, 1947, Serial No. 727,257

13 Claims. (Cl. 236—82)

1

The present invention relates to air control systems, and more particularly to an air control system in which means is provided to insure the rapid and accurate positioning of a diaphragm valve in response to variations in air pressure applied to the valve from an air control instrument.

In many instances it is difficult to get the valve of an air control system positioned at exactly the point called for by the condition under control particularly when small changes of the condition take place. This will result in oscillation or hunting of the value of the condition around the desired value. It is the principal object of this invention to provide an integrated control system in which the diaphragm valve, a control instrument and a valve positioner of novel design are so connected that the valve will at all times be moved exactly to the position called for by the instrument.

A further object of the invention is to provide a control system in which a proportioning type of instrument is used, and in which the follow-up action of the instrument is retarded until the valve has been positioned.

It is a further object of the invention to provide a valve positioner that is responsive in its operation to both the pressure of the air supplied to the valve and to the position of the valve. This positioner serves to control the flow of air from the output of the instrument to the follow-up provisions thereof. In effect the function of the valve positioner is to make any proportioning or reset type of control instrument function as an off-on type of instrument until the valve is moved substantially to its correct position. The positioner then permits the instrument to function in its normal manner to prevent hunting of the system.

A further object of the invention is to provide a pneumatic control system in which each of the units cooperates with each of the other units thereof in a novel manner. This cooperation of the parts produces an exceptionally stable system that is fast in its operation.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

2

In the drawing, the single figure shows, partly in section, a diagrammatic view of the applicant's control system.

The process herein described is the control of a temperature varying fluid in response to the temperature changes of some space which is under control. The process could, however, be applied equally as well to pressure or liquid level or any other variable. As is shown herein the temperature of the space under control is measured by a temperature responsive system including a bulb 1 and a Bourdon tube 2 which are connected by a capillary tube 3. As the temperature to which the bulb is subjected changes a temperature sensitive fluid within the system will expand or contract to change the size of the Bourdon tube. These changes are transferred to a pen arm 4 which has a pen 5 mounted upon its lower end. Movement of this pen across a chart, not shown, will give a record of the temperature under control. Connection between the Bourdon tube and the pen arm comprises a bracket 7 which is attached to the outer movable end of the Bourdon tube and an arm 8 which is fastened to a shaft 6 to which the pen arm is fastened. The bracket and the arm are connected by means of a suitable link 9.

Movement of the pen arm is transferred to a control unit 11 which acts to set up an air pressure that is proportional to the value of the temperature being measured. This unit may take the form of that shown in Moore Patent 2,125,081 and will be described herein only in enough detail to explain fully how the control system works. In order to operate the control unit from movements of the pen shaft 6 this shaft has an arm 12 extending to the left which is connected by a link 13 to one end of a floating lever 14, the other end of which is pivoted to a normally stationary arm at 15. As the pen moves due to a change in temperature, lever 14 will be moved and its movement is transferred to the control unit by means of a link 16 whose lower end is pivoted to a lever 17 that is pivoted at 18. The lever 17 is provided with a pin 19 which serves to move a flapper 21 around its pivot 22 relative to a nozzle 23. Relative movement of the flapper and nozzle are used to set up an air pressure which is applied to the control unit to give a follow up movement to the flapper and therefore causes the flapper to be positioned proportionally to the value of the temperature. To this end, the control unit is provided with a chamber 24 that is formed between a cup-shaped member 25 and a flexible bellows 26. As the pressure in the chamber varies, the bellows will be collapsed or expanded to move a bellows rod 27 axially to the right or left. This rod is provided on its right end with a pin 28 that engages one edge of a cam 29 which is pivoted at 31. The cam may be raised or lowered through suitable mechanism to vary the normal distance between the pin 28 and a second pin 32 that extends rearwardly from a lever 34 that is pivoted at 35. Movement of lever 34 is transferred through a pin 36 to a lever 37 which is pivoted at 38 and which has supported on its lower end lever 17. It will therefore be seen that as bellows 26 changes in length the pivot point 18 for the flapper actuating lever will be shifted to the right or to the left. As will be described below, a movement of flapper 21 toward the nozzle produces an increased air pressure in chamber 24. This will cause the bellows rod 27 to be moved to the right and act through the lever system to move the flapper away from the nozzle and thereby giving a so-called follow up movement so that the air pressure in chamber 24 will be proportional to the temperature under measurement.

The amount of movement given to lever 37 in response to a given change in length of bellows 26 may be varied by moving pin 36 with respect to levers 34 and 37. To this end pin 36 is mounted on the lower end of a supporting arm 39 that is pivoted at 41 to a plate 42. This plate is provided on its right edge with rack teeth that mesh with a pinion 43. Therefore rotation of the pinion will raise or lower pin 36 to change the amount of follow-up produced by the instrument for a given pressure change. This is known as changing the throttling range of the instrument since it changes the amount of air pressure variation produced for a given movement of the pen. It is noted that the natural resiliency of the bellows may be supplemented, if desired, by springs 44 and 45.

The normal value at which the temperature will be maintained is determined by the position of the pivot 15 for lever 14. This may be varied by raising or lowering the pivot. To this end the pivot is mounted on a member 82 that is pivoted at 83. The right edge of the member is arcuate in shape, and is provided with gear teeth 84. Meshing with the gear teeth is a pinion forming part of a gear train 85 that may be rotated to adjust member 82. In order to indicate the value at which the temperature will be maintained the member 82 is provided with an index 86 that also cooperates with the calibration marks of the chart, not shown.

Nozzle 23 is supplied through a pipe 46 and a restriction 47, with air that is filtered and regulated. Beyond the restriction a pipe 40 which is connected with the nozzle is also connected with a chamber 48 of a pilot valve 49. As the flapper is moved relative to the nozzle 23 the flow of air through this nozzle will be variably restricted to vary the pressure in chamber 48. As this pressure is varied a bellows 50, forming one wall thereof, will collapse or expand to move an exhaust port 51. If the pressure is increased in chamber 48 the exhaust port will be moved downwardly and act on a valve 52 to open an inlet port 53. If the pressure in chamber 48 is reduced due to a movement of the flapper away from the nozzle, bellows 50 will be expanded to raise the exhaust port 51 and permit the valve 52 to close the inlet port 53. Opening of port 51 or of port 53 causes the pressure in a chamber 54 to decrease or increase respectively since the exhaust port is connected with the atmosphere and the inlet port is connected with supply pipe 46. The pressure in chamber 54 is transmitted to chamber 56 of a control valve 57 that is located in a pipe 58. The latter pipe supplies a heat changing fluid to the space whose temperature the bulb 1 responds to. Valve 57 consists of a valve body 59 having a seat therein which is closed by a valve plug 61 that is attached to the lower end of a stem 62. The upper end of stem 62 is fastened to a diaphragm 63 that forms one wall of chamber 56. Normally a spring 64 biases diaphragm 63 upwardly against the force of pressure in chamber 56. It will therefore be seen that an increase in the temperature to which the bulb 1 is subjected will act through the apparatus described above to increase the pressure in chamber 56 and move the valve stem downwardly against the force of spring 64 to reduce the supply of temperature changing medium flow in pipe 58.

The air pressure which is supplied through chamber 54 to the control valve is also applied to valve positioner or interrupting device 65 that is controlled jointly by the air pressure supplied by the pilot valve and by the position of the plug in control valve 57. The valve positioner or interrupting device consists of a chamber 66 that is supplied with air through a pipe 67 which is connected with pipe 55 in the outlet of the pilot valve. This chamber is also connected by means of a pipe 68 to chamber 24 in the control unit 11. The ends of pipes 67 and 68 which terminate in chamber 66 may be closed alternately by a valve member 69 which is pivoted at 71 and normally biased in a counterclockwise direction toward the end of pipe 67 by means of a spring 72. Valve 69 is moved in a clockwise direction toward the end of a pipe 68 by means of a pin 73 that is attached to the end of a sealing bellows 74 which is inserted in the side of chamber 66. This bellows is elongated or contracted to move valve 69 by means of a rod 75 that is connected to this bellows and to the end of another bellows 76, the interior of which is in direct communication with the air pressure in pipe 67. The expansion of bellows 76 is opposed by a spring 77, one end of which is seated against the end of bellows 76 and the other end of which is seated against an upwardly extending arm of a bell crank lever 78 that is suitably pivoted at 79. The other arm of the bell crank lever is positively moved in accordance with the valve stem by means of a pin 81 which projects from the valve stem into a slot formed in the horizontally extending arm of the bell crank.

It will be seen that upon any change in the outlet of pressure of the pilot valve that valve member 69 will be moved to close the ends of either pipe 67 or pipe 68. If, for example, the pilot valve outlet pressure increases the pressure will be applied through pipe 67 to bellows 76 which will expand to move valve 69 clockwise to close off the end of pipe 68. This increase in pressure will also move valve stem 62 downwardly so that bell crank 78 will be rocked in a counterclockwise direction to compress spring 77. As the valve is moving into its proper position the force of spring 77 will be increased sufficiently to collapse bellows 76 and thereby move valve 69 to open the end of pipe 68. If the valve pressure in chamber 54 had decreased bellows 76 would be contracted to move valve 69 so that it will close the end of pipe 67. This same decrease in pressure will permit valve stem 62 to move upwardly and thereby move bell crank 78 in a clockwise direction to reduce the force of spring 77. As the valve is being positioned the force of spring 77 will decrease sufficiently so that valve 69 can open the end of pipe 67. Therefore any change in the output pressure of the pilot valve will act on valve 69 to prevent the flow of air in pipe 68 until the control valve has been substantially properly positioned.

From the above description it will be seen that an increase in temperature will operate through the lever mechanism to move lever 17 in a counterclockwise direction. This permits flapper 21 to throttle the flow of air from nozzle 23 and thereby build up pressure in chamber 48. This increase in pressure will cause exhaust port 51 to move downwardly and thereby permit valve 52 to open inlet port 53 in chamber 54. The increased air pressure in chamber 54 will be transmitted to control valve 57 to close this valve. This same air pressure will be transmitted to bellows 76 and cause valve 69 to close the end of pipe 68. When the control valve has been properly positioned valve 69 will be moved to open the end of pipe 68 and permit air pressure to be applied through that pipe to chamber 24 of the control unit. The increase in pressure in this chamber will collapse bellows 26 and act through the lever system of the control unit to move lever 31 in a counterclockwise direction and thereby give a follow-up movement to flapper 21. It will be seen that the valve positioner 65 serves to delay the operation of the follow-up mechanism of the control unit until after the control valve has been substantially positioned. If the temperature had decreased the reverse operation would have taken place. A drop in temperature will cause flapper 21 to move away from flapper 23 and thereby produce a pressure drop throughout the system. This pressure drop will cause valve 69 to close the end of pipe 67 until the control valve 57 has been properly positioned. At that time the pressure drop will be applied through pipe 68 to chamber 24 to give a reverse follow-up movement to flapper 21 from that previously obtained. By inserting the valve positioner 65 in the follow-up line to the control unit 11, this control unit is made to act as an on-off device until such time as the control valve has been substantially properly positioned. When this occurs the follow-up mechanism of the control unit is brought into operation so that the ultimate function of the control unit is that of a proportioning or throttling device. This type of operation means that the control valve will be more rapidly positioned and more accurately positioned than would be possible with a straight proportioning control unit. Furthermore, the control unit is prevented from giving its follow-up movement until the control valve has been properly positioned for a given change in temperature. Therefore if the control valve should stick, the pressure in the system would go to one or the other of its limits to insure overcoming of the stickiness of this valve and therefore the proper positioning thereof. The lining out of the system at a new pressure called for by a new temperature cannot take place until the control valve is moved to a position exactly called for by the new temperature.

From the above it will be seen that the control system described herein incorporating an interrupting device between the pilot valve and the follow-up means of the control unit insures an accurate control positioning of the control valve itself for even the smallest of temperature changes.

While in accordance with the provisions of the statues, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure with Letters Patent is:

1. In a control device, an air control instrument having follow-up means that is operative to produce an air pressure varying in accordance with the value of a condition under control, a diaphragm valve, means to apply said varying air pressure to said valve and to said follow-up means, means to delay the application of said varying air pressure to said follow-up means, and means operated in accordance with the position of said valve to control said delaying means.

2. In a control device, the combination of a control instrument having follow-up means formed as a part thereof, means responsive to a condition under control to adjust said control instrument, a control valve, means operated by said control instrument to apply a control impulse to said valve, and means operated jointly by said valve and said control impulse to regulate the application of said control impulse to said follow-up means.

3. In a control device, the combination of a control instrument having follow-up means, a control valve, means operated in accordance with the value of a condition to produce a control impulse, means to apply said control impulse to said valve and to said follow-up means, means to delay the application of said control impulse to said follow-up means, and means operated in accordance with the position of said valve to regulate said delaying means.

4. In a control device, a control instrument operative to set up an air pressure varying in accordance with the value of a condition, said instrument being provided with follow-up means, a control valve, means to apply said air pressure to said control valve to adjust the same and to said follow-up means, a valve device operative to control the application of said air pressure to said follow-up means, means responsive to said air pressure and operative upon a change in the value thereof to close said valve device, and means operated by said control valve as it moves toward its adjusted position to open said valve device.

5. In a control device, an air control instrument having follow-up means forming a portion thereof, a device responsive to the value of a condition and operative upon changes in said condition to adjust said instrument, means operative by said instrument to set up an air pressure in accordance with the changes in the value of said condition, a control valve, means to apply said air pressure to said control valve to position said control valve, means to apply said air pressure to said follow-up means, and means to delay the application of said control pressure to said follow-up means until said control valve has substantially reached the position called for by said air pressure.

6. In a control device, control mechanism having follow-up means forming a part thereof, an element responsive to variations in the value of a condition and operative to adjust said control mechanism, means operated by said control mechanism to supply a control impulse in agreement with changes in the value of the condition, a final control element, means to apply said control impulse to said control element to position the same, and to said follow-up means, and means to delay application of said control impulse to said follow-up means until said control element is substantially positioned.

7. In a contral device, a proportioning type air control instrument having follow-up means, means responsive to variations in the value of a condition operative to adjust said instrument to produce an air pressure varying in accordance with the value of said condition, a control valve, means to transfer said air pressure to said control valve, and mechanism operated jointly by said air pressure and said control valve to control the application of said air pressure to the follow-up means of said instrument.

8. In a control device, an air control instrument operative to set up an air pressure varying with variations in the value of a condition, said instrument including follow-up means, a control valve, means to apply said air pressure to said control valve and to said follow-up means, a device to delay the application of said air pressure to said follow-up means including a valve device, expansible means operable by said air pressure to close said valve device upon a change in said air pressure, resilient means to oppose the action of said expansible means, and means operated by said control valve to adjust said resilient means to open said valve device and thereby permit the change in air pressure to be applied to said follow-up means.

9. In a control device, a valve positioning device having a chamber, a connection to said chamber from a source of pressure, a connection from said chamber to a pressure responsive device, valve means in said chamber operative to close alternately said connections, means operative by a change in the pressure of said source of supply to move said valve means to close one of said connections, mechanism moved by a change in the pressure of said source, and parts operated by said mechanism to oppose the action of said means operated by a change in the pressure.

10. In an air control device adjusted in response to variations in the value of a controlled variable, a pilot valve operated by said air control system to adjust a pressure supply, a follow-up mechanism in said system and responsive to adjustments in said pressure supply, an interrupting device controlling the conduit for the transmission of said adjustments in the pressure supply to said follow-up mechanism, an air-operated motor responsive to the changes in pressure supply caused by said pilot valve, and a spring whose tension is varied by movement of a final control element under the control of said pilot valve, said spring opposing movements of said air-operated motor so as to move said interrupting device to open position when an adjustment in the pressure supply ceases to cause further movement of the final control element.

11. In an air-operated controller having a pilot valve and a final control element responsive to changes in the output pressure of said pilot valve, a follow-up mechanism forming part of said controller, a normally open valve controlling a conduit between the output side of said pilot valve and said follow-up mechanism, an air-operated motor movable in opposite directions in response to changes in the output pressure of said pilot valve and having operative engagement with said valve, a spring opposing the movements of said motor, and a mechanical connection between said final control element and said spring whereby any movement of said final control element varies the tension of said spring so that said spring moves said motor and said valve to open position when the output pressure of pilot valve stops changing the position of the final control element.

12. A valve positioner or interrupting device for controlling the flow of air from the output side of a pilot relay to the follow-up mechanism of an air-operated controller governing the movements of said pilot relay, including, a valve casing having inlet and outlet ports therein, a movable valve member normally out of engagement with said ports so that said interrupting device is open, an air-operated motor connected to the output side of said pilot relay and having a mechanical connection with said movable valve member to move it to close one or other of said ports, a spring stressing said movable valve member against said motor, and a second spring whose tension is varied in response to movements of a final control element governed by said pilot relay, the stress of said spring opposing the movement of said motor so as to return the movable valve member to disengagement with the valve ports when the output pressure of the pilot relay and the movement of the final control element are stabilized so that the changed output pressure of the pilot valve is transmitted in the follow-up mechanism.

13. In an air-operated controller, including, a measuring instrument responsive to a quality or condition under control, a controller actuated in response to the movements of said measuring instrument and including a follow-up mechanism, a pilot valve operated by said controller, and a final control element mounted under the control of said pilot valve, means for delaying the action of the follow-up mechanism, said means including, an air connection from the output side of said pilot valve to said follow-up mechanism, a valve controlling said connection, an air-operated motor connected to the output side of said pilot valve in parallel with said final control element and having operating engagement with the valve in said air connection so as to close and open said valve, and a linkage driven by the final control element to reposition said air-operated motor and to open said valve controlling said connection to the follow-up mechanism when the final control element reaches a position dictated by the measuring instrument.

DONALD PRESTON ECKMAN.

REFERENCES CITED

The following references are of record in the file of this patent:

UNITED STATES PATENTS

| Number | Name | Date |
|---|---|---|
| 2,035,966 | Hubbard | Mar. 31, 1936 |
| 2,117,800 | Harrison | May 17, 1938 |
| 2,264,262 | Erbguth | Nov. 25, 1941 |
| 2,292,761 | Krogh | Aug. 11, 1942 |